United States Patent
Jin et al.

(10) Patent No.: US 8,411,597 B2
(45) Date of Patent: Apr. 2, 2013

(54) METHOD, SYSTEM AND APPARATUS FOR SETTING UP MULTIMEDIA CALL

(75) Inventors: Hui Jin, Shenzhen (CN); Shuiping Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 12/793,145

(22) Filed: Jun. 3, 2010

(65) Prior Publication Data

US 2010/0240344 A1    Sep. 23, 2010

Related U.S. Application Data

(63) Continuation of application No. PCT/CN2008/073332, filed on Dec. 4, 2008.

(30) Foreign Application Priority Data

Dec. 4, 2007 (CN) .......................... 2007 1 0195627

(51) Int. Cl.
  *H04Q 11/00* (2006.01)
(52) U.S. Cl. ........................................ 370/261; 370/357
(58) Field of Classification Search .................. 370/329, 370/341, 431, 254–261, 351–357, 389, 262; 455/509, 434–464; 379/242; 710/316–317
  See application file for complete search history.

(56) References Cited

U.S. PATENT DOCUMENTS

| 6,879,828 | B2* | 4/2005 | Virtanen et al. ........... 455/426.1 |
| 2003/0202521 | A1 | 10/2003 | Havinis et al. | |
| 2004/0190498 | A1 | 9/2004 | Kallio et al. | |
| 2005/0180338 | A1* | 8/2005 | Pirila et al. ..................... 370/252 |
| 2006/0194584 | A1* | 8/2006 | Henttonen et al. ............ 455/450 |
| 2007/0135165 | A1* | 6/2007 | Junghanns et al. ........... 455/560 |
| 2010/0093346 | A1* | 4/2010 | Song et al. ................. 455/435.1 |

FOREIGN PATENT DOCUMENTS

| CN | 1373971 A | 10/2002 |
| CN | 101064680 A | 10/2007 |
| CN | 101080097 A | 11/2007 |
| EP | 2 015 592 A1 | 1/2009 |

(Continued)

OTHER PUBLICATIONS

3GPP, "3rd Generation Partnership Project; Technical Specification Group Core Network and Terminals; Mobile radio interface Layer 3 specification; Core network protocols; Stage 3 (Release 7)," 3GPP TS 24.008 V7.9.0 Technical Specification, Sep. 2007, 549 pages.

(Continued)

*Primary Examiner* — Mark Rinehart
*Assistant Examiner* — Mang Yeung
(74) *Attorney, Agent, or Firm* — Slater & Matsil, L.L.P.

(57) ABSTRACT

A method includes receiving a multimedia request message; setting up a multimedia call path to a CS UE according to the multimedia request message; negotiating a media coding mode with the CS UE and negotiating the media coding mode with a peer UE according to the multimedia call path; and setting up a multimedia call between the CS UE and the peer UE after determining the coding mode of the CS UE and the peer UE. In the embodiments of the present invention, the MSC negotiates the coding mode of the CS UE and the peer UE (such as an IMS UE), and sets up a multimedia call between the CS UE and the peer UE, thus overcoming the inability of setting up a multimedia call between the CS UE and the peer UE in the prior art.

5 Claims, 10 Drawing Sheets

FOREIGN PATENT DOCUMENTS

| WO | WO 02/052825 A1 | 7/2002 |
| WO | WO 2007/045527 A1 | 4/2007 |
| WO | WO 2007/143896 A1 | 12/2007 |

OTHER PUBLICATIONS

Written Opinion of the International Searching Authority, International Application No. PCT/CN2008/073332, Mailing Date: Mar. 19, 2009, Huawei Technologies Co., Ltd., et al., 5 pages.

First Chinese Office Action, Chinese Application No. 200710195627.7, Mailing Date: Feb. 12, 2010, 14 pages.

3GPP TS 23.279 V7.5.0, XP-002452202, "3rd Generation Patnership Project; echnical Specification Group Services and System Aspects; Combining Circuit Switched (CS) abd IP Multimedia Subsystem (IMS) services; stage 2 (Release 7)," Dec. 2006, pp. 1-35.

3GPP TR 23.892 V1.4.0, 3rd Generation Partnership Project; Technical Specification Group Services and Systems Aspects; IP Multimedia System (IMS) centralizized services; (Release 8) Nov. 2007, pp. 1-160.

Extended European Search Report, European Application No. 08859745.5-1244 / 2234341, Applicant: Huawei Technologies Co., LTD., Dated: Jul. 6, 2011, 7 pages.

International Search Report, International application No. PCT/CN2008/073332, Date of mailing of the international search report Mar. 19, 2009, 6 pages.

* cited by examiner

FIG. 1

PRIOR ART

FIG. 10 ical Application No. PCT/CN2008/073332, filed Dec. 4,
METHOD, SYSTEM AND APPARATUS FOR SETTING UP MULTIMEDIA CALL This application is a continuation of co-pending International Application No. PCT/CN2008/073332, filed Dec. 4, 2008, which designated the United States and was not published in English, and which claims priority to Chinese Application No. 200710195627.7 filed Dec. 4, 2007, both of which applications are incorporated herein by reference.

TECHNICAL FIELD

The present invention relates to network communication technologies, and in particular, to a method, a system, and an apparatus for setting up a multimedia call.

BACKGROUND

Currently, mobile communication networks are primarily Circuit-Switched (CS) domain networks, including Global System for Mobile communication (GSM) and Code Division Multiple Access (CDMA). Service providers set up good and diversified service platforms based on CS domain networks. In such platforms, a Mobile Switching Center (MSC) is responsible for routing calls and executing service logics, for example, Call Forwarding (CF) service. In addition, the MSC works together with other Application Servers (ASs) such as a Color Ring Back Tone (CRBT) server in the CS domain network to provide services. However, the service provision of the CS domain network requires support of the visited MSC, which is unfavorable to introducing new services.

The Internet protocol Multimedia Subsystem (IMS) is an effective solution to emergence of multiple networks (for example, mobile network, fixed network, television network) in the communication field currently. In the evolution process of the IMS network, it is necessary to ensure consistent service experience of the user regardless of the access mode such as CS network access and Packet Switched (PS) network access. The user does not need to perceive the specific access mode, for example, in receiving or sending a call and adding or invoking service data configuration. Therefore, the 3rd Generation Partnership Project (3GPP) puts forward IMS Centralized Service (ICS), in which the CS network bears voice or Visual Phone (VP) media to set up an IMS call on a User Equipment (UE), and the AS in the IMS provides services for the call. An important aspect of the ICS is that the traditional CS UE accesses an IMS network. When the CS UE accesses the IMS network, the MSC server is an enhancement of the MSC server of the existing CS network. The enhanced MSC server can convert the CS domain signaling (3GPP TS 24.008) into a Session Initial Protocol (SIP) signaling, and send the SIP signaling to the IMS network so that the user can enjoy the IMS service. Under the control of the MSC server, a Media Gateway (MGW) performs switching between the CS access bearing and the Real-time Transport Protocol (RTP) bearing. RTP bearing means that the media stream is transmitted over an RTP. The RTP runs on an IP network. The MSC server may control one or more MGWs. The MSC server and the MGW controlled by it are collectively called "MSC" herein.

Figure 1:
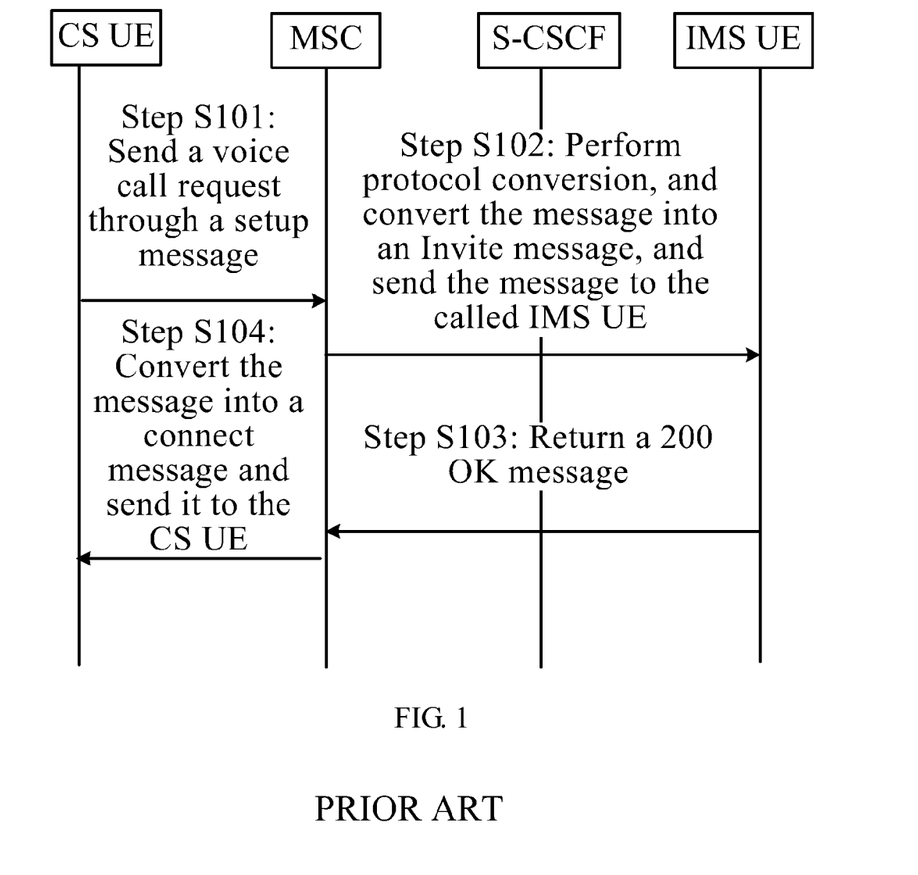
FIG. 1 is a flowchart of initiating a call from a UE in the prior art.

FIG. 1 is a flowchart of initiating a call from a UE in the prior art. The MSC can convert the call request sent by the CS UE into a SIP Invite request. The conversion process includes the following steps:

Step S101: The calling CS UE sends a voice call request to the MSC through a setup message.

Step S102: The MSC performs protocol conversion for the voice call request of the calling CS UE, converts the CS domain setup message into a SIP Invite message, and sends the message to the called IMS UE through a Serving-Call Session Control Function (S-CSCF).

Step S103: The called IMS UE hooks off and answers the call, and returns a 200 OK message to the MSC.

Step S104: The MSC performs protocol conversion for the SIP 200 OK message, and converts the 200 OK message into a connect message. After receiving the connect message, the calling CS UE sets up a call with the called party.

The prior art has at least the following defects in the prior art. The MSC in the prior art supports only conversion between the 3GPP TS 24.008 and the SIP, for example, conversion from a Setup message into an Invite message, or conversion from an Invite message into a Setup message. Such signaling conversion implements only the basic functions such as setting up voice calls, and is unable to set up sophisticated services such as multimedia calls.

SUMMARY OF THE INVENTION

The embodiments of the present invention provide a method, a system, and an apparatus for setting up a multimedia call so that a CS UE negotiates the coding mode with the peer UE (such as an IMS UE) through the MSC to set up a multimedia call between the CS UE and the peer UE.

A method for setting up a multimedia call in an embodiment of the present invention includes:

receiving a multimedia request message;

setting up a multimedia call path to a CS UE according to the multimedia request message;

negotiating a media coding mode with the CS UE and negotiating a media coding mode with a peer UE according to the multimedia call path; and setting up a multimedia call between the CS UE and the peer UE after determining the coding mode of the CS UE and the peer UE.

A system for setting up a multimedia call in an embodiment of the present invention includes a CS UE that is adapted to set up a multimedia call path to an MSC, and negotiate a media coding mode with the MSC. The MSC, adapted to receive a multimedia request message, set up the multimedia call path to the CS UE according to the multimedia request message, negotiate a media coding mode with the CS UE and a peer UE each according to the multimedia call path, and set up a multimedia call between the CS UE and the peer UE after determining a coding mode of the CS UE and the peer UE. The peer UE is adapted to report its capability set to the MSC.

An MSC provided in an embodiment of the present invention includes a request message receiving module, adapted to receive a multimedia request message. A negotiating and determining module is adapted to negotiate a media coding mode of a CS UE and a peer UE according to a multimedia call path after the multimedia call path is set up, and determine a media coding mode of the CS UE and the peer UE. A multimedia call setup module is adapted to set up a multimedia call between the CS UE and the peer UE according to the determined media coding mode of the CS UE and the peer UE.

Compared with the prior art, the technical solution under the present invention brings a number of benefits. An MSC negotiates a decoding mode of a CS UE and a peer UE (such as an IMS UE) to set up a multimedia call between the CS UE and the peer UE, thus overcoming the inability of setting up a multimedia call between the CS UE and the peer UE in the prior art.

DETAILED DESCRIPTION OF ILLUSTRATIVE EMBODIMENTS

The following detailed description is directed to the technical solution of the present invention with reference to the accompanying drawings. However, the embodiments to be described are only part of, rather than all of, the embodiments of the present invention. Additionally, all other embodiments, which can be derived by those skilled in the art from the embodiments given herein without any creative efforts, fall within the scope of the present invention.

Figure 2:
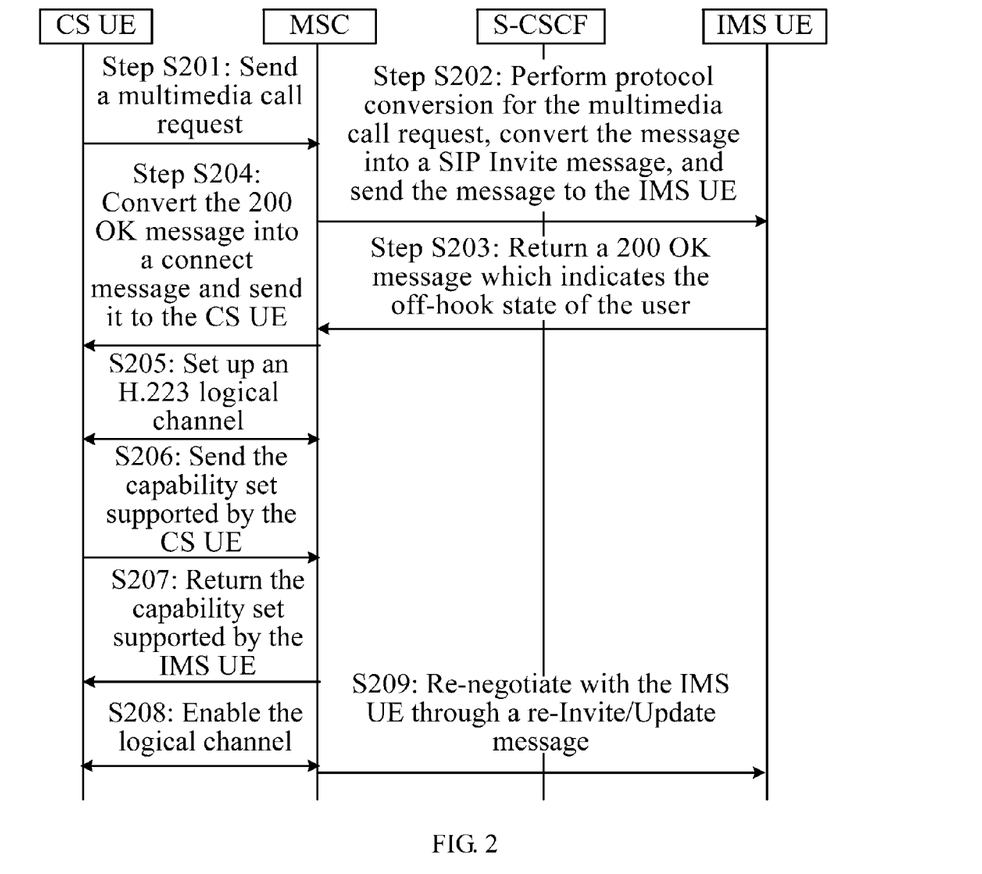
FIG. 2 is a flowchart of a method for setting up a multimedia call in the first embodiment of the present invention.

A method for setting up a multimedia call is provided in the first embodiment of the present invention. In this embodiment, the CS UE serves as a calling party, and the IMS UE serves as a called party. In the following embodiments of the present invention, the MSC server and the MGW controlled by the MSC server are called "MSC". FIG. 2 is a flowchart of a method for setting up a multimedia call in the first embodiment of the present invention. The method includes the following steps.

Step S201: Through a Setup message, the CS UE initiates a multimedia call request to the MSC. The multimedia call request carries a multimedia indication. For example, the call request includes a MuMe parameter which indicates that the call is a VP call.

Step S202: The MSC performs protocol conversion for the multimedia call request, and converts the CS domain setup message into a SIP Invite message. The Invite message also carries multimedia indication information of the VP, for example, speech/video indication. The Invite message is transmitted to the IMS UE through the S-CSCF.

Step S203: The IMS UE hooks off, and returns a 200 OK message to the MSC, indicating that the user hooks off. According to the multimedia indication in the received Invite message, the IMS UE sends its capability set to the MSC. The capability set provides the information such as the coding mode supported by the IMS UE.

Step S204: The MSC performs protocol conversion, converts the 200 OK message into a connect message, and sends the connect message to the CS UE, to set up a multimedia call path between the MSC and the CS UE.

Step S205: An H.223 logical channel is set up between the CS UE and the MSC. The CS UE and the MSC can negotiate the coding mode through the multimedia call path. The H.223 sets forth an application standard for multiplexing multiple channels of audio and multimedia signals in a single mobile communication channel. The multimedia communication of the CS network requires the multiplexing technology to support hybrid synchronous transmission of multimedia, voice, and data traffic. The multiplexing technology specifies a logical channel for each media type, and can combine multiple channels of bit streams provided by different media sources into a single bit stream, which can be transmitted on a single channel.

Step S206: The CS UE sends the capability set supported by the CS UE to the MSC. The capability set provides the information such as the coding mode supported by the CS UE.

Step S207: The MSC returns the capability set supported by the IMS UE to the CS UE.

Step S208: The final media stream coding mode is selected, and then the logical channel is enabled and a multimedia call is set up between the CS UE and the IMS UE.

Step S209: After the CS UE selects the final media stream coding mode, if the MSC does not expect to convert the code in view of the result of negotiation with the CS UE, the MSC, optionally, can negotiate with the IMS UE again through a re-Invite/Update message. In this way, the IMS UE updates its coding mode to the coding mode used by the CS UE.

Figure 3:
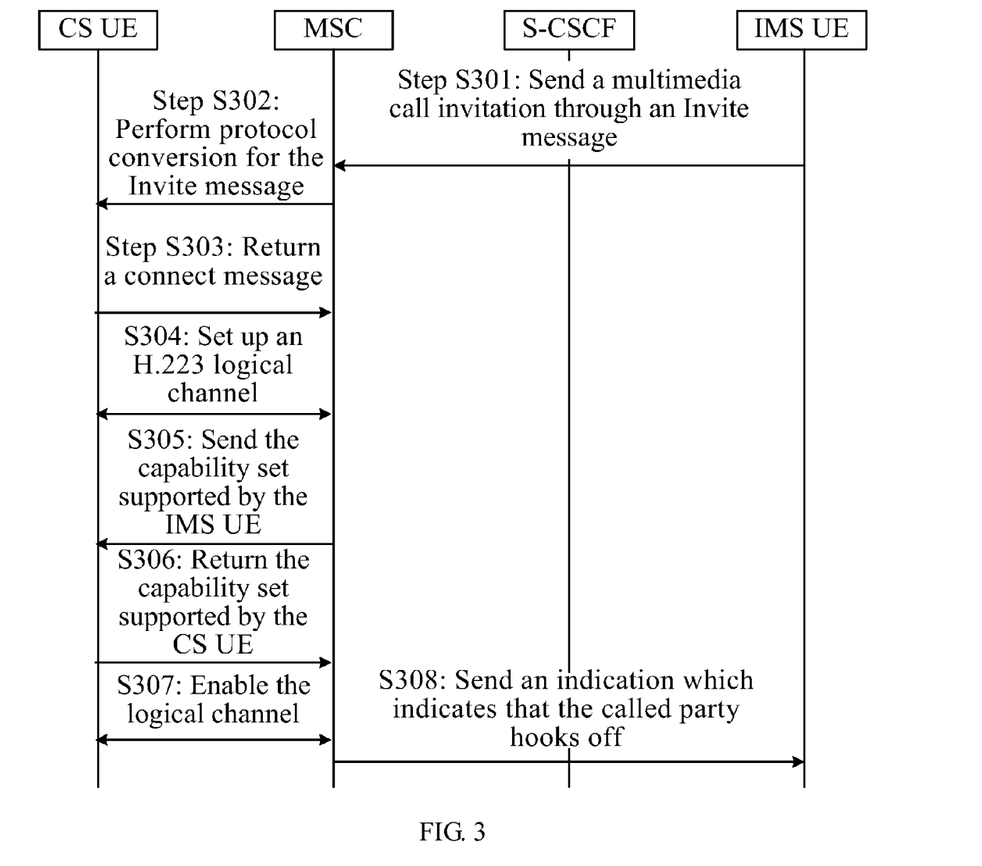
FIG. 3 is a flowchart of a method for setting up a multimedia call in the second embodiment of the present invention.

A method for setting up a multimedia call is provided in the second embodiment of the present invention. As shown in FIG. 3, in this embodiment, the IMS UE serves as a calling party and the CS UE serves as a called party. The method includes the following steps:

Step S301: Through an Invite message, the IMS UE sends a multimedia call invitation to the CS UE. The Invite message includes a speech/video indication. The IMS UE sends the supported capability set to the MSC. The capability set provides the information such as the supported coding mode.

Step S302: The MSC performs protocol conversion, and converts the SIP Invite message into a CS domain setup message. The message carries a multimedia request indication. For example, the setup message carries a MuMe parameter.

Step S303: The CS UE accepts a call request, and returns a connect message to the MSC, to set up a multimedia call path between the MSC and the CS UE. The CS UE can negotiate the coding mode with the MSC through the multimedia call path.

Step S304: An H.223 logical channel is set up between the CS UE and the MSC.

Step S305: After the multimedia call path is set up successfully, the MSC sends the capability set supported by the IMS UE to the CS UE. The capability set provides the information such as the coding mode supported by the peer.

Step S306: The CS UE returns the capability set supported by the CS UE to the MSC.

Step S307: The final media stream coding mode is selected, and then a logical channel is enabled.

Step S308: The MSC sends the IMS UE an indication which indicates that the called party hooks off, and sets up a multimedia call between the CS UE and the IMS UE.

Figure 4:
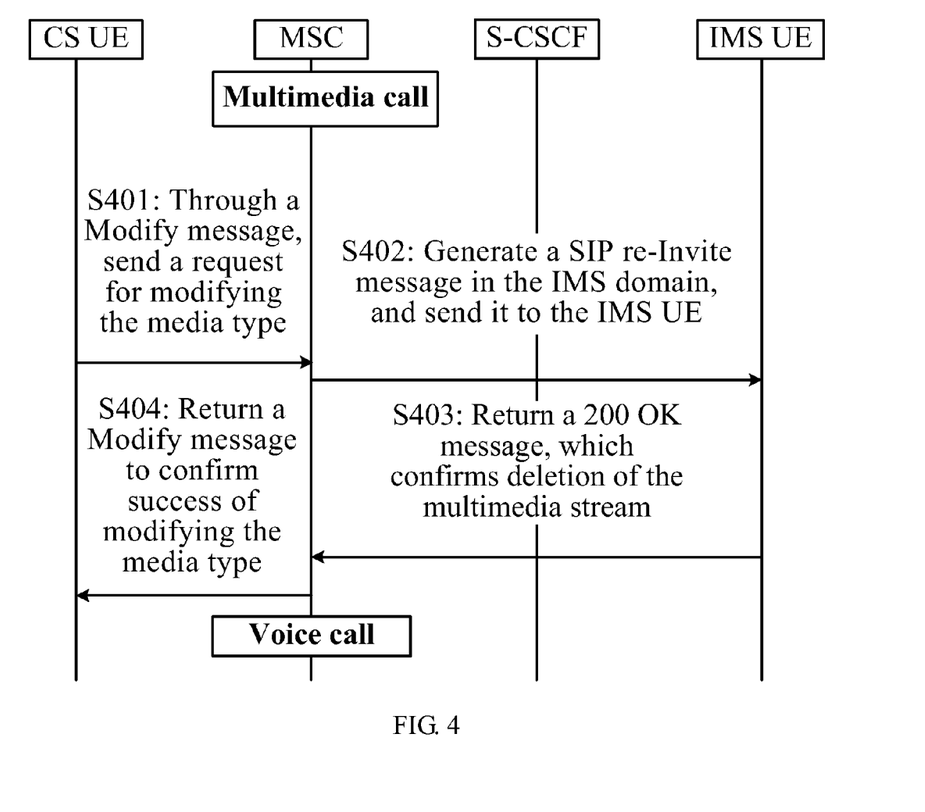
FIG. 4 is a flowchart of a method for changing a multimedia call service in the third embodiment of the present invention.

A method for changing a multimedia call service is provided in the third embodiment of the present invention. In this embodiment, after a multimedia call is set up successfully, the CS UE initiates modification of the media type and requests changing the multimedia call to a voice call, and the CS UE and the MSC support Service Change and UDI/RDI Fallback (SCUDIF). SCUDIF is a CS network service feature. Service Change enables the UE to shift between a voice call and a multimedia call in the call process without interrupting the call. Fallback enables the UE to set up a voice call when the UE fails in an attempt of setting up a multimedia call, and ensures successful setup of the conversation. FIG. 4 is a flowchart of a method for changing a multimedia call service in the third embodiment of the present invention. The method includes the following steps.

Step S401: Through a Modify message, the CS UE sends a request for modifying the media type to the MSC.

Step S402: After receiving the Modify message of the CS domain, the MSC generates a SIP re-Invite message indicating deletion of the multimedia stream in the IMS domain. The message is transmitted to the IMS UE through an S-CSCF.

Step S403: The IMS UE returns a 200 OK message, which confirms deletion of the multimedia stream.

Step S404: The MSC returns a Modify message to the CS UE to confirm success of modifying the media type, and finally, converts the multimedia call to a voice call.

Figure 5:
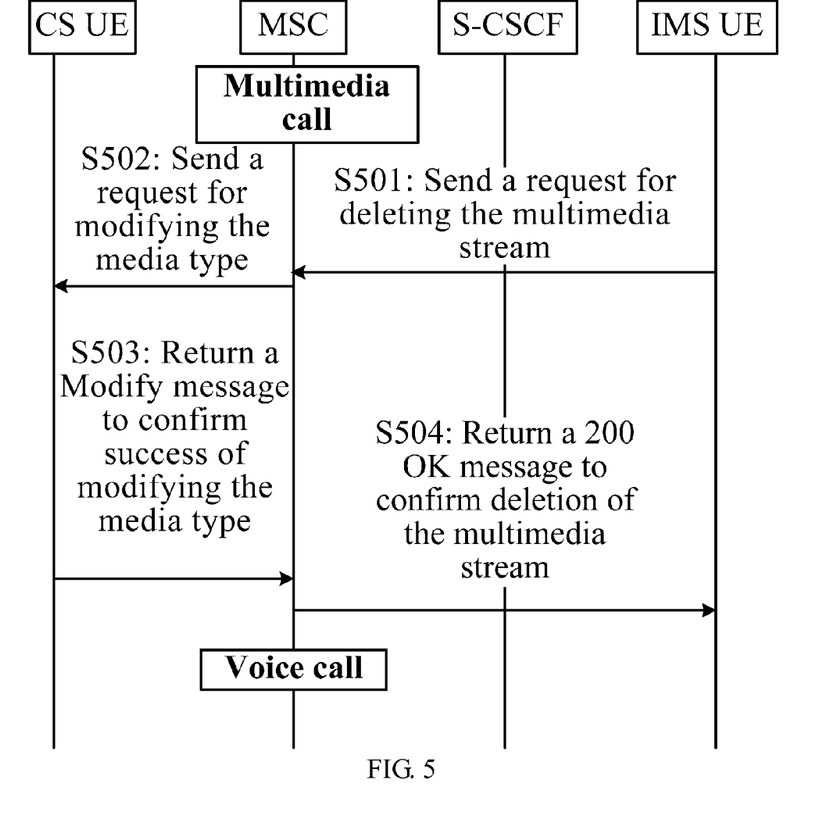
FIG. 5 is a flowchart of a method for changing a multimedia call service in the fourth embodiment of the present invention.

A method for changing a multimedia call service is provided in the fourth embodiment of the present invention. In this embodiment, after a multimedia call is set up successfully, the IMS UE initiates modification of the media type and requests changing the multimedia call to a voice call, and the CS UE and the MSC support SCUDIF. FIG. 5 is a flowchart of a method for changing a multimedia call service in the fourth embodiment of the present invention. The method includes the following steps.

Step S501: The IMS UE sends a request for deleting the multimedia stream to the MSC, and requests updating the multimedia call to a voice call.

Step S502: After receiving a SIP re-Invite/Update message, the MSC generates a Modify message in the CS domain according to the SCUDIF feature, and sends a media type modification request to the CS UE.

Step S503: The CS UE returns a Modify message to the MSC, confirming success of modifying the media type.

Step S504: The MSC returns a 200 OK message to the IMS UE to confirm success of deleting the multimedia stream, and finally, converts the multimedia call to a voice call.

Figure 6:
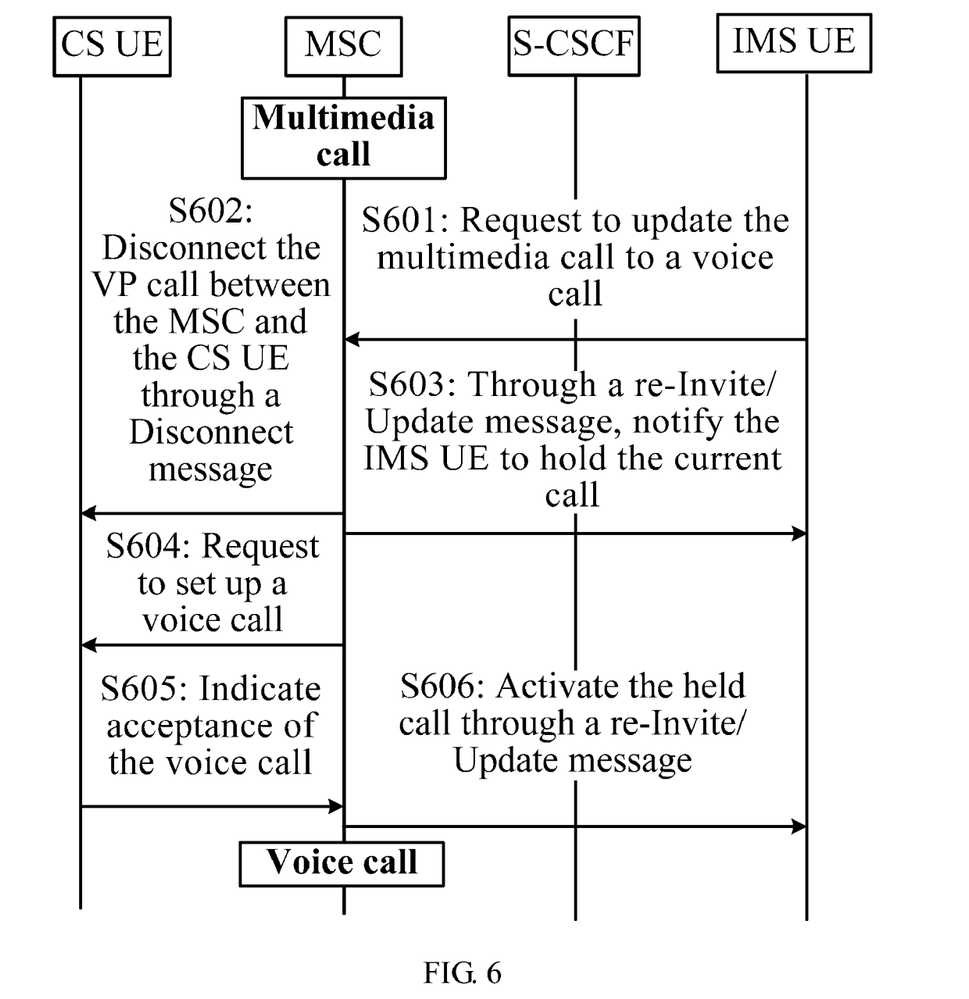
FIG. 6 is a flowchart of a method for changing a multimedia call service in the fifth embodiment of the present invention.

A method for changing a multimedia call service is provided in the fifth embodiment of the present invention. As shown in FIG. 6, in this embodiment, after a multimedia call is set up successfully, the IMS UE initiates modification of the media type, and requests changing the multimedia call to a voice call, but the CS UE or the MSC does not support SCUDIF. FIG. 6 is a flowchart of a method for changing a multimedia call service in the fifth embodiment of the present invention. The method includes the following steps.

Step S601: Through a re-Invite/Update message, the IMS UE sends a request for updating the multimedia call to a voice call.

Step S602: The VP call between the MSC and the CS UE is disconnected through a Disconnect message.

Step S603: Through a re-Invite/Update message, the MSC instructs the IMS UE to hold the current call.

Step S604: The MSC sends a setup message to the CS UE to request setup of a voice call.

Step S605: The CS UE sends a Connect message to the MSC, indicating acceptance of the voice call.

Step S606: Through a re-Invite/Update message, the MSC activates the held call, and the multimedia call is converted into a voice call.

Figure 7:
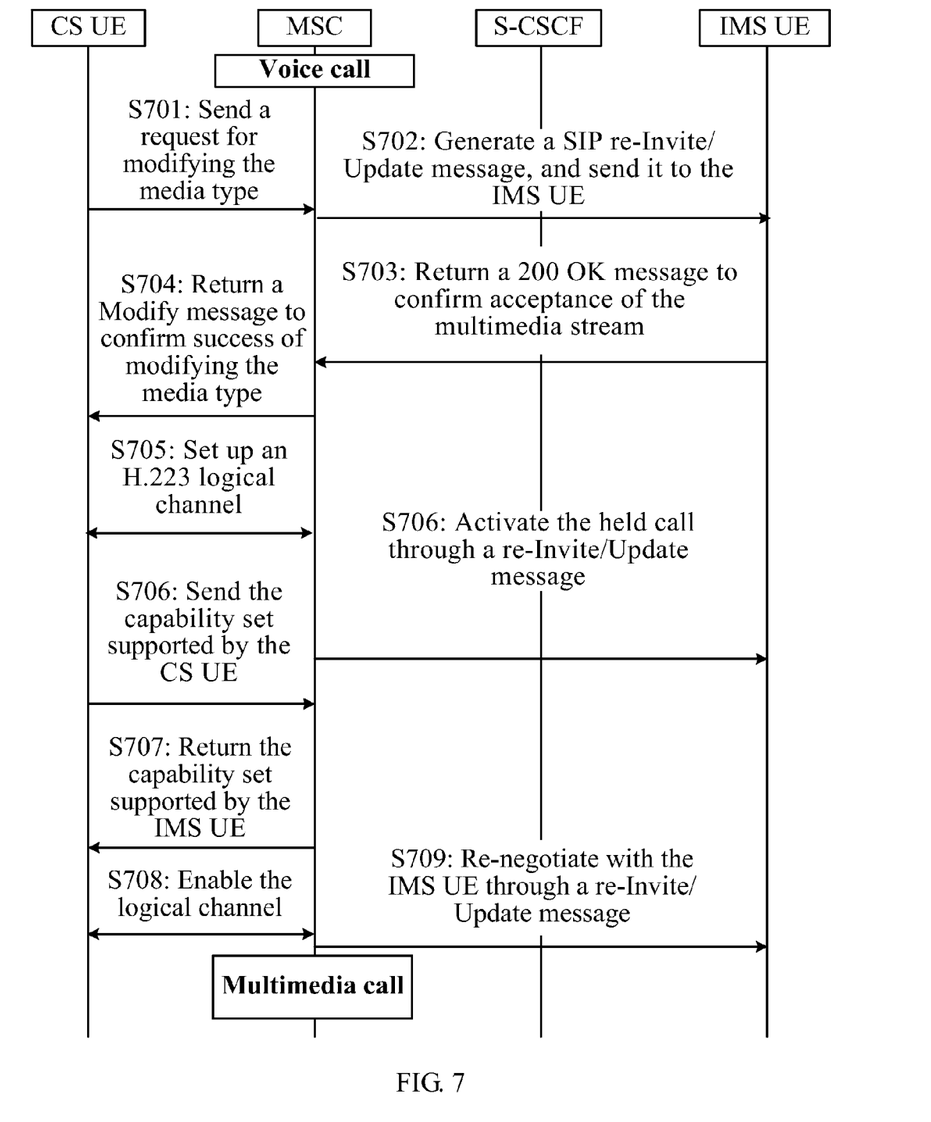
FIG. 7 is a flowchart of a method for setting up a multimedia call in the sixth embodiment of the present invention.

A method for setting up a multimedia call is provided in the sixth embodiment of the present invention. In this embodiment, the CS UE initiates modification of the media type, and requests changing the voice call to a multimedia call, and the CS UE and the MSC support SCUDIF. FIG. 7 is a flowchart of a method for setting up a multimedia call in the sixth embodiment of the present invention. The method includes the following steps.

Step S701: Through a Modify message, the CS UE sends a request for modifying the media type to the MSC, and requests updating a voice call to a multimedia call.

Step S702: After receiving the Modify message of the CS domain, the MSC generates a SIP re-Invite/Update message indicating addition of a multimedia stream in the IMS domain. The message is transmitted to the IMS UE through an S-CSCF.

Step S703: The IMS UE returns a 200 OK message, which confirms acceptance of the multimedia stream. According to the received re-Invite/Update message, the IMS UE sends its capability set to the MSC. The capability set provides the information such as the coding mode supported by the IMS UE.

Step S704: The MSC returns a Modify message to the CS UE to confirm success of modifying the media type, to set up a multimedia call path between the MSC and the CS UE.

Step S705: An H.223 logical channel is set up between the CS UE and the MSC.

Step S706: The CS UE sends the capability set supported by the CS UE to the MSC. The capability set provides the information such as the coding mode supported by the CS UE.

Step S707: The MSC returns the capability set supported by the IMS UE to the CS UE.

Step S708: The final media stream coding mode is selected, and then the logical channel is enabled, and a multimedia call is set up between the CS UE and the IMS UE.

Step S709: If the MSC does not expect to convert the code in view of the result of negotiation with the CS UE, the MSC can negotiate with the IMS UE again through a re-Invite/Update message. In this way, the IMS UE updates its coding mode to the coding mode used by the CS UE.

Figure 8:
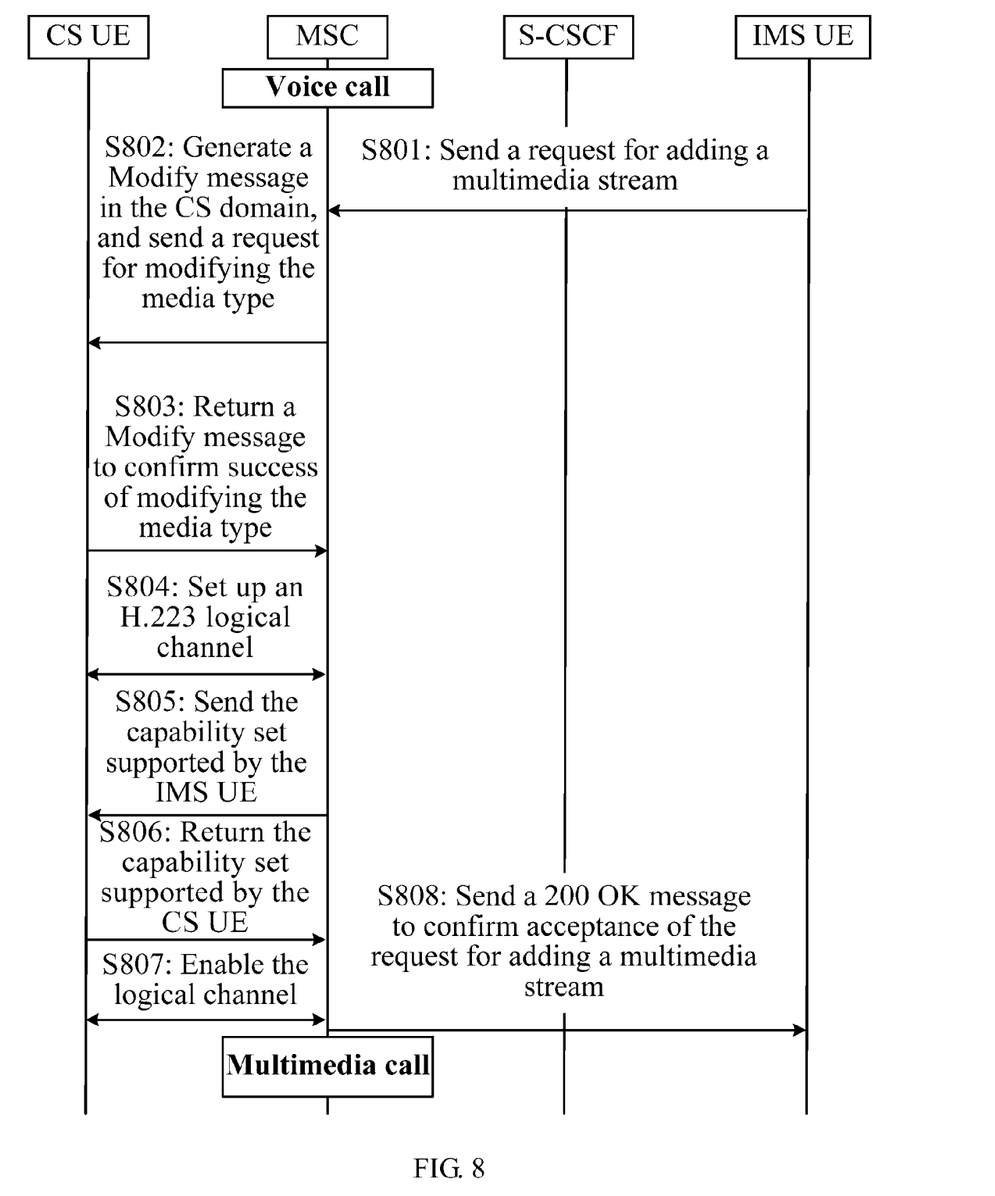
FIG. 8 is a flowchart of a method for setting up a multimedia call in the seventh embodiment of the present invention.

A method for setting up a multimedia call is provided in the seventh embodiment of the present invention. In this embodiment, the IMS UE initiates modification of the media type, and requests changing the voice call to a multimedia call, and the CS UE and the MSC support SCUDIF. FIG. 8 is a flowchart of a method for setting up a multimedia call in the seventh embodiment of the present invention. The method includes the following steps.

Step S801: The IMS UE sends a request for adding a multimedia stream to the MSC (for example, re-Invite/Update message that carries a multimedia identifier), requests updating the voice call to a multimedia call, and sends the capability set supported by the IMS UE to the MSC. The capability set provides the information such as the coding mode supported by the IMS UE.

Step S802: After receiving a SIP re-Invite/Update message, the MSC generates a Modify message in the CS domain according to the SCUDIF feature, and sends a media type modification request to the CS UE.

Step S803: The CS UE returns a Modify message to the MSC to confirm success of modifying the media type, to set up a multimedia call path between the MSC and the CS UE.

Step S804: An H.223 logical channel is set up between the CS UE and the MSC.

Step S805: The MSC sends the capability set supported by the IMS UE to the CS UE. The capability set provides the information such as the coding mode supported by the peer.

Step S806: The CS UE returns the capability set supported by the CS UE to the MSC.

Step S807: The final media stream coding mode is selected, and then a logical channel is enabled.

Step S808: The MSC returns a 200 OK message to the IMS UE to confirm acceptance of the request for adding a multimedia stream.

Figure 9:
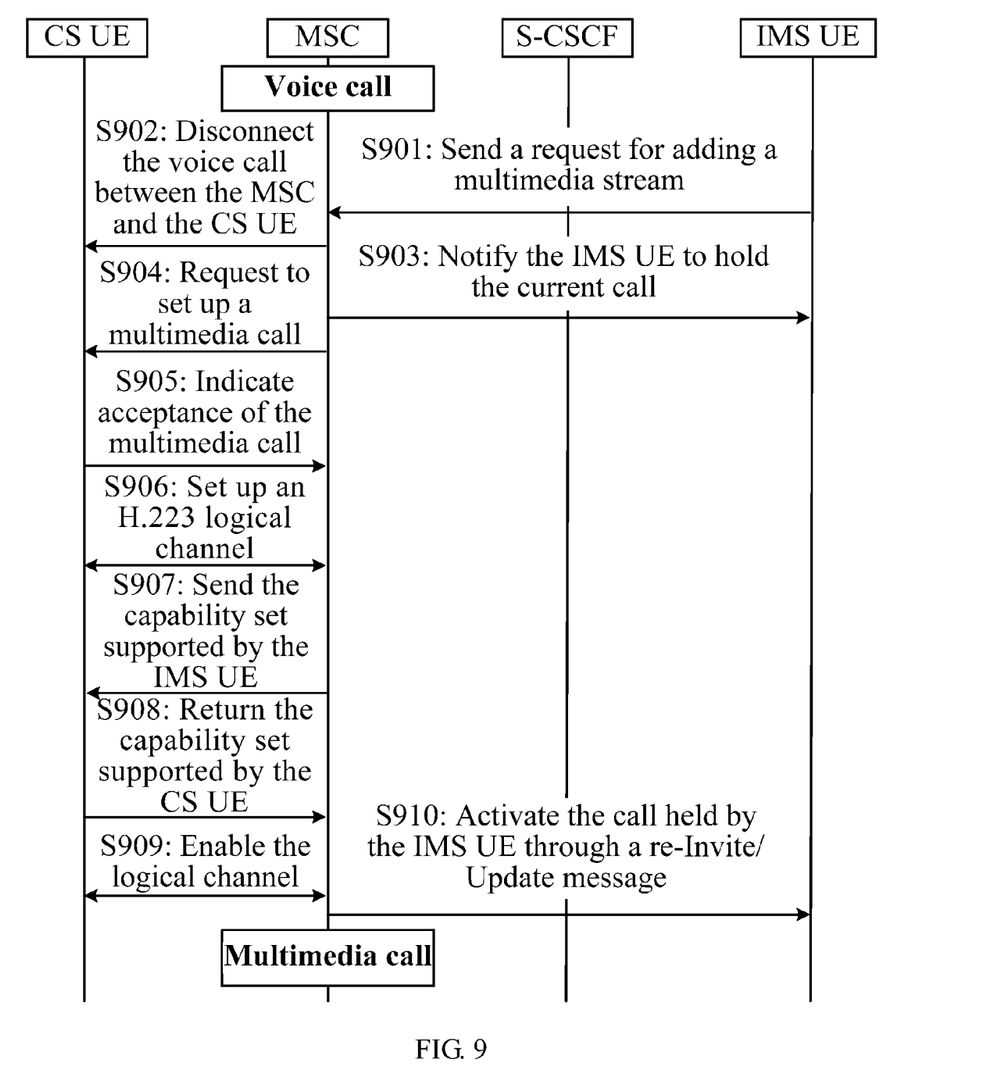
FIG. 9 is a flowchart of a method for setting up a multimedia call in the eighth embodiment of the present invention.

A method for setting up a multimedia call is provided in the eighth embodiment of the present invention. In this embodiment, the IMS UE initiates modification of the media type, and requests changing the voice call to a multimedia call, but the CS UE or the MSC does not support SCUDIF. FIG. 9 is a flowchart of a method for setting up a multimedia call in the eighth embodiment of the present invention. The method includes the following steps.

Step S901: Through a re-Invite/Update message, the IMS UE sends a request for adding a multimedia stream, requests updating the voice call to a multimedia call, and sends the capability set supported by the IMS UE to the MSC. The capability set provides the information such as the coding mode supported by the IMS UE.

Step S902: The voice call between the MSC and the CS UE is disconnected through a Disconnect message.

Step S903: Through a re-Invite/Update message, the MSC instructs the IMS UE to hold the current call.

Step S904: The MSC sends a setup message to the CS UE to request setup of a multimedia call.

Step S905: The CS UE sends a Connect message to the MSC to indicate acceptance of the multimedia call, to set up a multimedia call path between the MSC and the CS UE.

Step S906: An H.223 logical channel is set up between the CS UE and the MSC.

Step S907: After the H.223 logical channel on the CS network side is set up successfully, the MSC sends the capability set supported by the IMS UE to the CS UE. The capability set provides the information such as the coding mode supported by the peer.

Step S908: The CS UE returns the capability set supported by the CS UE to the MSC.

Step S909: The final media stream coding mode is selected, and then a logical channel is enabled.

Step S910: Through a re-Invite/Update message, the MSC activates the call held by the IMS UE.

Figure 10:
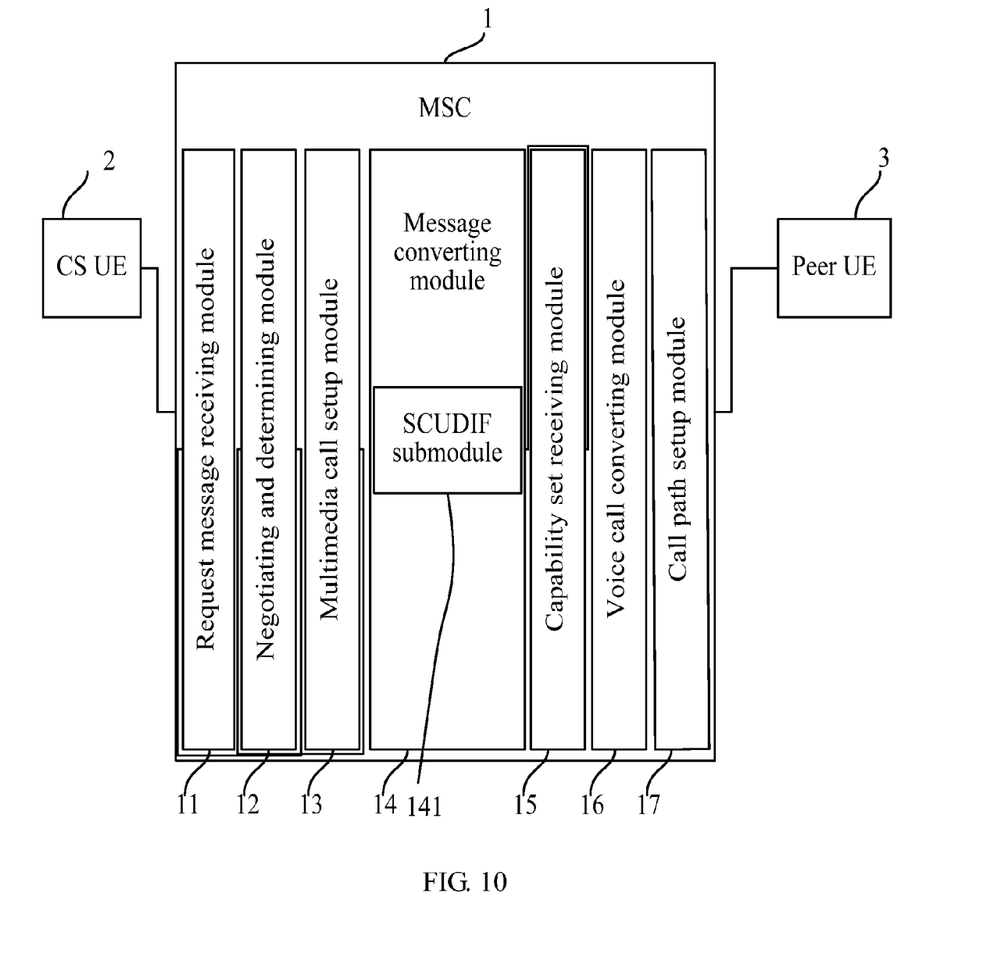
FIG. 10 shows a structure of a system for setting up a multimedia call in an embodiment of the present invention.

A system for setting up a multimedia call is provided in an embodiment of the present invention. As shown in FIG. 11, the system includes a CS UE 2, adapted to set up a multimedia call path to an MSC 1, and negotiate a media coding mode with the MSC 1. An MSC 1 is adapted to receive a multimedia request message, set up the multimedia call path to the CS UE 2 according to the multimedia request message, negotiate a media coding mode with the CS UE 2 and a peer UE 3 each according to the multimedia call path, and set up a multimedia call between the CS UE 2 and the peer UE 3 after determining the coding mode of the CS UE 2 and the peer UE 3. A peer UE 3 is adapted to report its capability set to the MSC 1.

The MSC 1 includes a request message receiving module 11, adapted to receive a multimedia request message. A negotiating and determining module 12 is adapted to: negotiate a media coding mode of the CS UE 2 and the peer UE 3 according to the multimedia call path after the multimedia call path is set up, and determine a media coding mode of the CS UE 2 and the peer UE 3. A multimedia call setup module 13 is adapted to set up a multimedia call between the CS UE 2 and the peer UE 3 according to the determined media coding mode of the CS UE 2 and the peer UE 3.

The MSC 1 further includes a message converting module 14 adapted to convert the multimedia request message received by the request message receiving module 11 and then send the converted message to the peer UE3. A capability set receiving module 15 is adapted to receive the capability set of the peer UE3 which is sent by the peer UE3 after receiving the multimedia request message.

The message converting module 14 includes an SCUDIF submodule 141, which is adapted to make the MSC 1 support the SCUDIF function and perform conversion of the Modify request message between the CS UE 2 and the peer UE 3.

The MSC 1 further includes a voice call converting module 16, which is adapted to receive a Modify request message that carries a voice indication from the CS UE 2 or the peer UE 3 after the multimedia call setup module 13 sets up a multimedia call between the CS UE 2 and the peer UE 3, and switches the multimedia call to a voice call according to the voice indication.

The MSC 1 further includes: a call path setup module 17, adapted to set up a multimedia call path to the CS UE 2 so that the CS UE 2 can transmit capability set information to the MSC 1 through the multimedia call path.

Through the method and the system for setting up multimedia calls in an embodiment of the present invention, the MSC negotiates the decoding mode of the CS UE and the IMS UE to set up a multimedia call between the CS UE and the IMS UE. Moreover, through the technical solution under the present invention, a multimedia call may be switched to a voice call after the multimedia call is set up between the CS UE and the IMS UE, or a voice call may be switched to a multimedia call after the voice call is set up between the CS UE and the IMS UE.

After reading the foregoing embodiments, those skilled in the art are clearly aware that the present invention may be implemented through hardware, or through software in addition to a necessary universal hardware platform. Therefore, the technical solution under the present invention may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present invention.

The above descriptions are merely preferred embodiments of the present invention, but not intended to limit the scope of the present invention. Any modification, equivalent replacement, or improvement made without departing from the spirit and principle of the present invention should fall within the scope of the present invention.

What is claimed is:

1. A method for setting up a multimedia call, the method comprising:
  receiving, by a Mobile Switching Center, a multimedia request message,
  setting up, by the Mobile Switching Center, a multimedia call path to a Circuit Switched (CS) User Equipment (UE) according to the multimedia request message;
  negotiating, by the Mobile Switching Center, a media coding mode with the CS UE and negotiating a media coding mode with a peer UE according to the multimedia call path; and
  setting up, by the Mobile Switching Center, a multimedia call between the CS UE and the peer UE after determining a coding mode of the CS UE and the peer UE;

wherein the multimedia request message is a call mode change request message sent by the CS UE, and indicates that the CS UE requires switching from a current voice call to the multimedia call;

wherein, before setting up the multimedia call path to the CS UE according to the multimedia request message, the method further comprises disconnecting, by the Mobile Switching Center, the voice call from the CS UE after receiving the media stream change request message; and sending, by the Mobile Switching Center, a multimedia request setup message to the CS UE; and wherein the method further comprises instructing, by the Mobile Switching Center, the peer UE to hold a current call, and activating, by the Mobile Switching Center, the held call through a re-Invite/Update message after determining the coding mode of the CS UE and the peer UE.

2. The method of claim 1, wherein after determining the coding mode of the CS UE and the peer UE, the method further comprises:

determining, by the Mobile Switching Center (MSC), whether code conversion is required according to the determined coding mode; and re-negotiating, by the Mobile Switching Center, the coding mode with the peer UE after determining that the code conversion is required.

3. The method of claim 1, wherein after setting up the multimedia call between the CS UE and the peer UE, the method further comprises:

receiving, by the Mobile Switching Center, a call mode change request message sent by the CS UE, wherein the call mode change request message carries a voice indication indicating that the CS UE requests switching a current multimedia call to a voice call;

converting, by the Mobile Switching Center, the call mode change request message into a media stream change request message that carries the voice indication, and sending the message to the peer UE; and notifying, by the Mobile Switching Center, the CS UE after receiving a multimedia stream deletion confirmation message returned by the peer UE, and switching the multimedia call to the voice call.

4. The method of claim 1, wherein before setting up the multimedia call path to the CS UE according to the multimedia request message, the method further comprises:

converting, by the Mobile Switching Center, the call mode change request message into a media stream change request message and sending the media stream charge request message to the peer UE, and adding a multimedia indication to the media stream change request message; and receiving, by the Mobile Switching Center, a media stream change confirmation message returned by the peer UE, wherein the media stream change confirmation message carries a capability set of the peer UE, and notifying the CS UE.

5. The method of claim 1, wherein after determining the coding mode of the CS UE and the peer UE, the method further comprises:

returning, by the Mobile Switching Center, a confirmation message to the peer UE, and notifying the determined coding mode to the peer UE.

* * * * *